US012624206B2

(12) United States Patent
Hsu et al.

(10) Patent No.: US 12,624,206 B2
(45) Date of Patent: May 12, 2026

(54) RESIN COMPOSITION AND ARTICLE MADE THEREFROM

(71) Applicant: Elite Material Co., Ltd., Taoyuan City (TW)

(72) Inventors: Ching-Hsien Hsu, Taoyuan City (TW); Jun-Yan Yu, Taoyuan City (TW); Yu-Chiao Shih, Taoyuan City (TW)

(73) Assignee: Elite Material Co., Ltd., Taoyuan City (TW)

( * ) Notice: Subject to any disclaimer, the term of this patent is extended or adjusted under 35 U.S.C. 154(b) by 784 days.

(21) Appl. No.: 17/899,873

(22) Filed: Aug. 31, 2022

(65) Prior Publication Data

US 2023/0383121 A1 Nov. 30, 2023

Related U.S. Application Data

(60) Provisional application No. 63/345,247, filed on May 24, 2022.

(51) Int. Cl.
*C08L 71/02* (2006.01)
*C08L 47/00* (2006.01)
*C08L 53/02* (2006.01)

(52) U.S. Cl.
CPC ............... *C08L 71/02* (2013.01); *C08L 47/00* (2013.01); *C08L 53/02* (2013.01)

(58) Field of Classification Search
CPC .. C08F 290/062; C08F 230/02; C08F 279/02; C08L 51/08; C08L 51/003
See application file for complete search history.

(56) References Cited

U.S. PATENT DOCUMENTS

2016/0272812 A1* 9/2016 Zhou ........................ C08L 69/00
2020/0181402 A1 6/2020 Liu et al.
2021/0054173 A1 2/2021 Tsuji et al.
2021/0108075 A1* 4/2021 Chang ........................ B32B 7/06

FOREIGN PATENT DOCUMENTS

CN 110527037 A * 12/2019 ............. B32B 27/08
TW 202014464 A 4/2020

* cited by examiner

*Primary Examiner* — Anthony J Frost
(74) *Attorney, Agent, or Firm* — MUNCY, GEISSLER, OLDS & LOWE, P.C.

(57) ABSTRACT

A resin composition includes 100 parts by weight of a vinyl group-containing polyphenylene ether resin, 10 parts by weight to 20 parts by weight of a polyolefin, 15 parts by weight to 45 parts by weight of a first phosphorus-containing compound and 5 parts by weight to 15 parts by weight of a second phosphorus-containing compound, wherein the polyolefin includes a styrene-butadiene-maleic anhydride terpolymer or a butadiene-maleic anhydride copolymer, the first phosphorus-containing compound includes a compound of Formula (I), and the second phosphorus-containing compound includes a compound of Formula (II), a compound of Formula (III) or a combination thereof. The resin composition may be used to make various articles, such as a prepreg, a resin film, a laminate or a printed circuit board, and at least one of the following properties can be improved, including difference rate of dissipation factor before and after 24 hours of water absorption, Z-axis coefficient of thermal expansion and dissipation factor after 24 hours of water absorption.

9 Claims, No Drawings

RESIN COMPOSITION AND ARTICLE MADE THEREFROM

CROSS-REFERENCE TO RELATED APPLICATION

This application claims the priority benefits of U.S. provisional application Ser. No. 63/345,247, filed on May 24, 2022. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward the fifth generation mobile communication technology (5G) and the trend of high performance and miniaturization of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates. In addition, in order to comply with the trend of environmental protection, halogen-containing flame retardants that are likely to cause environmental pollution have been gradually replaced, and halogen-free flame retardants are thereby used, such as nitrogen-containing or phosphorus-containing compounds. However, the use of halogen-free flame retardants may deteriorate the dielectric properties or other physical properties of the electronic materials. Therefore, there is a need for solving one or more of the above-mentioned problems.

SUMMARY

To overcome the problems facing prior arts, particularly one or more of the above-mentioned technical problems of conventional materials, it is a primary object of the present disclosure to provide a resin composition and an article made therefrom which may overcome at least one of the above-mentioned technical problems.

To achieve the above-mentioned object, the present disclosure provides a resin composition, comprising 100 parts by weight of a vinyl group-containing polyphenylene ether resin, 10 parts by weight to 20 parts by weight of a polyolefin, 15 parts by weight to 45 parts by weight of a first phosphorus-containing compound and 5 parts by weight to 15 parts by weight of a second phosphorus-containing compound, wherein:

the polyolefin comprises a styrene-butadiene-maleic anhydride terpolymer or a butadiene-maleic anhydride copolymer;

the first phosphorus-containing compound comprises a compound of Formula (I):

Formula (I)

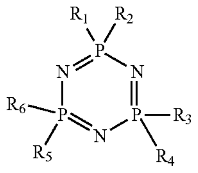

wherein any one, two or three of $R_1$ to $R_6$ are a p-vinylphenoxy group, and the remaining are a phenoxy group;

the second phosphorus-containing compound comprises a compound of Formula (II), a compound of Formula (III), or a combination thereof:

Formula (II)

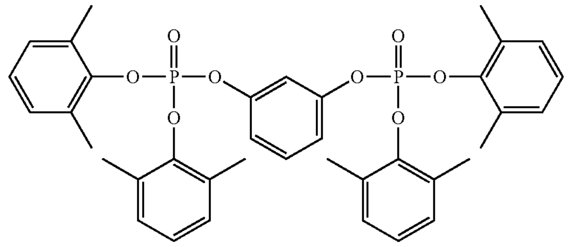

Formula (III)

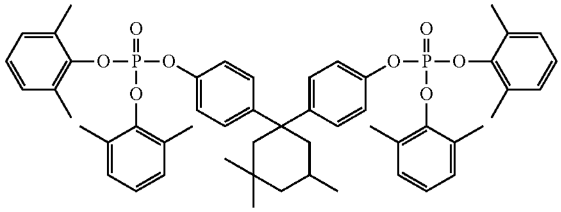

.

For example, in one embodiment, the vinyl group-containing polyphenylene ether resin comprises a vinylbenzyl group-containing biphenyl polyphenylene ether resin, a methacrylate group-containing polyphenylene ether resin or a combination thereof.

For example, in one embodiment, the first phosphorus-containing compound comprises a compound of Formula (IV), a compound of Formula (V), a compound of Formula (VI) or a combination thereof:

Formula (IV)

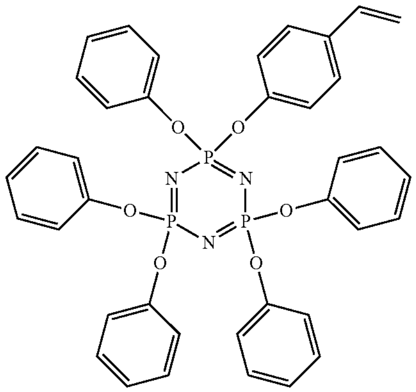

-continued

Formula (V)

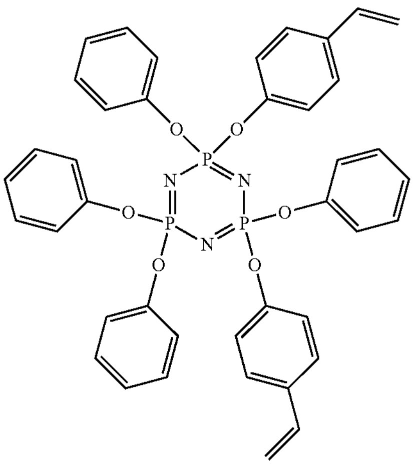

Formula (VI)

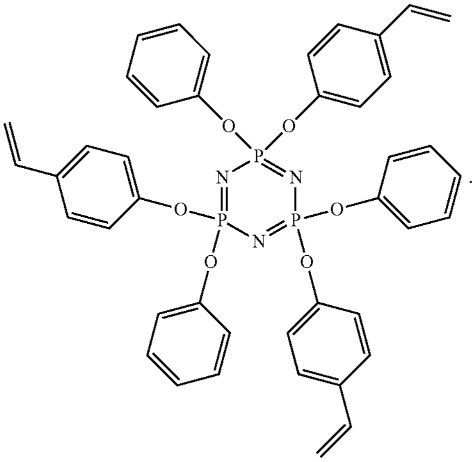

For example, in one embodiment, the resin composition may further optionally comprise a maleimide resin, an acenaphthylene or a combination thereof.

For example, in one embodiment, the resin composition further optionally comprises inorganic filler, flame retardant, curing accelerator, polymerization inhibitor, solvent, silane coupling agent, coloring agent, toughening agent, or a combination thereof.

To achieve the above-mentioned objects, the present disclosure further provides an article made from the resin composition, including a prepreg, a resin film, a laminate or a printed circuit board.

For example, in one embodiment, articles made from the resin composition disclosed herein at least have one, more or all of the following properties:

a difference rate of dissipation factor of less than or equal to 83% calculated according to a dissipation factor as measured by reference to JIS C2565 at 10 GHz before and after 24 hours of water absorption performed at constant temperature by reference to JIS C6481;

a Z-axis coefficient of thermal expansion as measured by reference to IPC-TM-650 2.4.24.5 of less than or equal to 32 ppm/° C.; and a dissipation factor of less than or equal to 0.0049 as measured by reference to JIS C2565 at 10 GHz after 24 hours of water absorption performed at constant temperature by reference to JIS C6481.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term “comprises,” “comprising,” “contains,” “containing,” “includes,” “including,” “encompass,” “encompassing,” “has,” “having” or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term “or” refers to an inclusive or and not to an exclusive or. For example, a condition “A or B” is satisfied by any one of the following: A is true (or present) and B is false (or not present), A is false (or not present) and B is true (or present), and both A and B are true (or present). In addition, whenever open-ended transitional phrases are used, such as “comprises,” “comprising,” “includes,” “including,” “encompass,” “encompassing,” “has,” “having” or any other variant thereof, it is understood that transitional phrases such as “consisting essentially of” and “consisting of” are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of “1 to 8” should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of “between 1 and 8” should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

Unless otherwise specified, according to the present disclosure, a polymer refers to the product formed by monomer (s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, an oligomer, etc., but not limited thereto. Unless otherwise specified, according to the present disclosure, the homopolymer refers to a polymer formed by polymerizing one kind of monomer. Unless otherwise specified, according to the present disclosure, the copolymer refers to a product formed by subjecting two or more kinds of monomers to a polymerization reaction. For example, copolymers may comprise: random copolymers, such as a structure of -AABABB-BAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. Unless otherwise specified, according to the present disclosure, the prepolymer refers to a polymer having a lower molecular weight between the molecular weight of monomer and the molecular weight of final polymer, and the prepolymer contains a reactive functional group capable of participating further polymerization to obtain the final polymer product which has been fully crosslinked or cured. In the present disclosure, the oligomer refers to a polymer with 2-20, typically 2-5, repeating units.

Unless otherwise specified, according to the present disclosure, a modification comprises a product derived from a resin with its reactive functional group modified, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

As used herein, "vinyl group-containing" refers to the presence of an ethylenic carbon-carbon double bond (C═C) or a functional group derived therefrom in a compound, such as a reactive carbon-carbon double bond (C═C) functional group. Therefore, examples of "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

Unless otherwise specified, as used herein, part(s) by weight represents weight part(s) in any weight unit, such as but not limited to kilogram, gram, pound and so on. For example, 100 parts by weight of a vinyl group-containing polyphenylene ether resin may represent 100 kilograms of the vinyl group-containing polyphenylene ether resin or 100 pounds of the vinyl group-containing polyphenylene ether resin. If a resinous solution comprises solvent and resin, the part by weight of (solid or liquid) resin generally refers to the weight unit of the (solid or liquid) resin, not including the weight unit of the solvent in the solution, and the part by weight of the solvent refers to the weight unit of the solvent.

The following embodiments and examples are illustrative in nature and are not intended to limit the present disclosure and its application. In addition, the present disclosure is not bound by any theory described in the background and summary above or the following embodiments or examples.

As described above, it is a primary object of the present disclosure to provide a resin composition, comprising 100 parts by weight of a vinyl group-containing polyphenylene ether resin, 10 parts by weight to 20 parts by weight of a polyolefin, 15 parts by weight to 45 parts by weight of a first phosphorus-containing compound and 5 parts by weight to 15 parts by weight of a second phosphorus-containing compound, wherein:

- the polyolefin comprises a styrene-butadiene-maleic anhydride terpolymer or a butadiene-maleic anhydride copolymer;
- the first phosphorus-containing compound comprises a compound of Formula (I):

Formula (I)

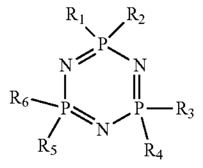

wherein any one, two or three of $R_1$ to $R_6$ are a p-vinylphenoxy group, and the remaining are a phenoxy group;

the second phosphorus-containing compound comprises a compound of Formula (II), a compound of Formula (III), or a combination thereof:

Formula (II)

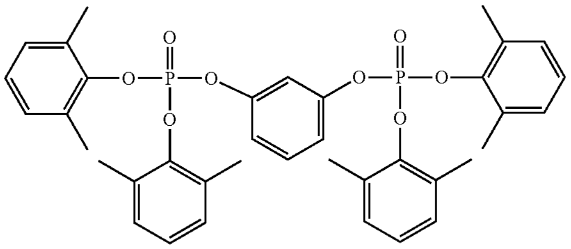

Formula (III)

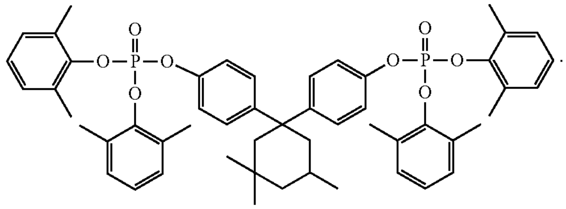

For example, in the resin composition of the present disclosure, relative to 100 parts by weight of the vinyl group-containing polyphenylene ether resin, the amount of the polyolefin may range from 10 parts by weight to 20 parts by weight, such as but not limited to 10 parts by weight, 12 parts by weight, 13 parts by weight, 15 parts by weight or 20 parts by weight of the polyolefin. For example, the resin composition comprises 100 parts by weight of a vinyl group-containing polyphenylene ether resin and 16 parts by weight of a polyolefin.

For example, in the resin composition of the present disclosure, relative to 100 parts by weight of the vinyl group-containing polyphenylene ether resin, the amount of the first phosphorus-containing compound may range from 15 parts by weight to 45 parts by weight, such as but not limited to 15 parts by weight, 20 parts by weight, 25 parts by weight, 30 parts by weight or 45 parts by weight of the first phosphorus-containing compound. For example, the resin composition comprises 100 parts by weight of a vinyl group-containing polyphenylene ether resin and 28 parts by weight of a first phosphorus-containing compound.

For example, in the resin composition of the present disclosure, relative to 100 parts by weight of the vinyl group-containing polyphenylene ether resin, the amount of the second phosphorus-containing compound may range from 5 parts by weight to 15 parts by weight, such as but not limited to 5 parts by weight, 6 parts by weight, 10 parts by weight, 12 parts by weight or 15 parts by weight of the second phosphorus-containing compound. For example, the resin composition comprises 100 parts by weight of a vinyl group-containing polyphenylene ether resin and 8 parts by weight of a second phosphorus-containing compound.

For example, in one embodiment, the vinyl group-containing polyphenylene ether resin may comprise various vinyl group-containing polyphenylene ether resins known in the art to which this disclosure pertains. The vinyl group-containing polyphenylene ether resin suitable for the present disclosure is not particularly limited and may comprise any one or more commercially available products, self-prepared products, or a combination thereof. Examples of the vinyl group-containing polyphenylene ether resin may include but not limited to a polyphenylene ether resin containing a vinyl group, an allyl group, a vinylbenzyl group or a methacrylate group. For example, in one embodiment, the vinyl group-containing polyphenylene ether resin comprises a vinylbenzyl group-containing biphenyl polyphenylene ether resin, a methacrylate group-containing polyphenylene ether resin (i.e., methacryloyl group-containing polyphenylene ether resin), an allyl group-containing polyphenylene ether resin, a vinylbenzyl group-containing bisphenol A polyphenylene ether resin, a chain-extended vinyl group-containing polyphenylene ether resin or a combination thereof. For example, the vinyl group-containing polyphenylene ether resin may be a vinylbenzyl group-containing biphenyl polyphenylene ether resin with a number average molecular weight of about 1200 (such as OPE-2st 1200, available from Mitsubishi Gas Chemical Co., Inc.), a vinylbenzyl group-containing biphenyl polyphenylene ether resin with a number average molecular weight of about 2200 (such as OPE-2st 2200, available from Mitsubishi Gas Chemical Co., Inc.), a methacrylate group-containing polyphenylene ether resin with a number average molecular weight of about 1900 to 2300 (such as SA9000, available from Sabic), a vinylbenzyl group-containing bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety. Unless otherwise specified, the aforesaid vinyl group-containing polyphenylene ether resin is construed as including prepolymers or modifications of these components.

For example, in one embodiment, the polyolefin comprises a styrene-butadiene-maleic anhydride terpolymer or a butadiene-maleic anhydride copolymer. For example, in one embodiment, the polyolefin may include products such as Ricon184MA6, Ricon130MA8, Ricon130MA13, Ricon130MA20, Ricon131MA5, Ricon131MA10, Ricon131MA17, and Ricon131MA20 available from Cray valley.

In the present disclosure, the first phosphorus-containing compound comprises a compound of Formula (I), wherein any one, two or three of $R_1$ to $R_6$ are a p-vinylphenoxy group, and the remaining are a phenoxy group. For example, in the compound of Formula (I), $R_1$ to $R_6$ independently represent a structure of Formula (A) or Formula (B), wherein the symbol "*" represents the bonding position with the phosphorus atom (P) in the structure of Formula (I), the compound of Formula (I) has 1, 2 or 3 structures of Formula (A) and 3, 4 or 5 structures of Formula (B), and in the compound of Formula (I), the total number of structures of Formula (A) and Formula (B) is 6.

Formula (A)

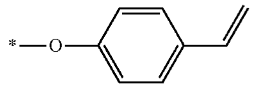

Formula (B)

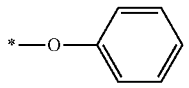

For example, the first phosphorus-containing compound may be used as a phosphorus-containing flame retardant in a resin composition, which belongs to a halogen-free flame retardant; because any one, two or three of $R_1$ to $R_6$ in the compound of Formula (I) are a reactive p-vinylphenoxy group, the first phosphorus-containing compound may be used as a reactive phosphorus-containing flame retardant in a resin composition. In other words, because the compound of Formula (I) has 1, 2 or 3 structures of Formula (A), the compound of Formula (I) may be crosslinked with a reactive functional group of other resins through the vinyl group moiety of the structure of Formula (A), so that the first phosphorus-containing compound may be used as a reactive phosphorus-containing flame retardant in a resin composition.

For example, in one embodiment, the first phosphorus-containing compound comprises any one of the compound of Formula (IV), the compound of Formula (V) and the compound of Formula (VI). For example, in one embodiment, the first phosphorus-containing compound comprises a mixture of any two of the compound of Formula (IV), the compound of Formula (V) and the compound of Formula (VI). For example, in one embodiment, the first phosphorus-containing compound comprises a mixture of all of the compound of Formula (IV), the compound of Formula (V) and the compound of Formula (VI).

Formula (IV)

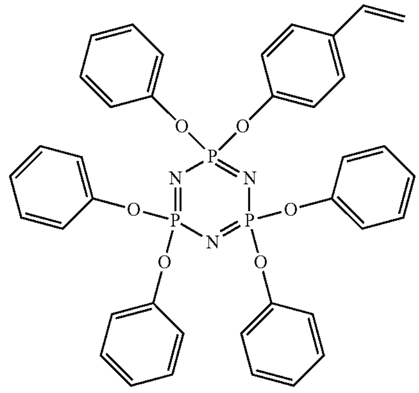

-continued

Formula (V)

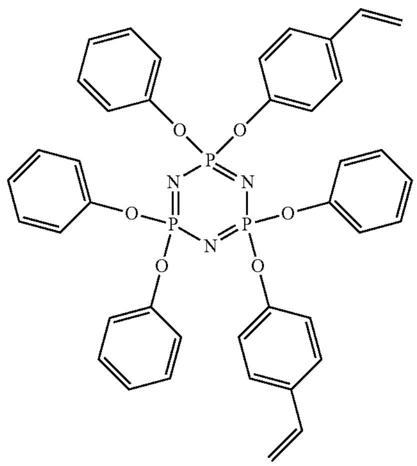

Formula (VI)

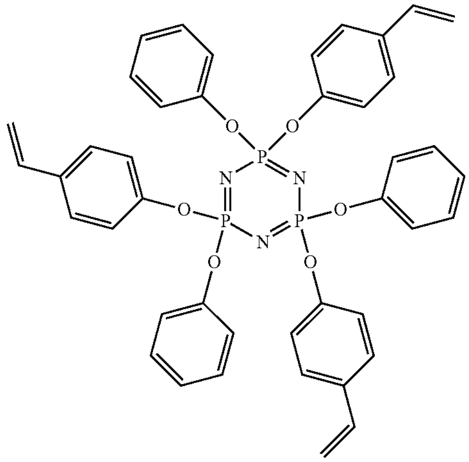

For example, in one embodiment, the first phosphorus-containing compound comprises a mixture of the compound of Formula (IV), the compound of Formula (V) and the compound of Formula (VI). For example, in one embodiment, in the first phosphorus-containing compound, Formula (IV): Formula (V): Formula (VI)=40-60 (mol %): 30-45 (mol %): 0-20 (mol %). In another embodiment, in the first phosphorus-containing compound, Formula (IV): Formula (V): Formula (VI)=50-60 (mol %): 35-45 (mol %): 0-5 (mol %). In still another embodiment, in the first phosphorus-containing compound, Formula (IV): Formula (V): Formula (VI)=40-50 (mol %): 30-40 (mol %): 10-20 (mol %).

The first phosphorus-containing compound can be commercially available and prepared by the conventional process. For example, 1 mol of hexachloro cyclotriphosphazene, 1-6 mol of p-vinylphenol, 1-6 mol of phenol and a proper amount of solvent (such as but not limited to a mixed solvent with a weight ratio of toluene to methyl ethyl ketone of 1:1) can be added to a reactor, introduced with nitrogen and continuously stirred. After heated to 60-150° C., the mixture was added with a catalyst (such as but not limited to sodium hydroxide and tetrabutylammonium iodide) and continued reacting for 4-20 hours, followed by cooling to room temperature and filtration. After the filtrate was distilled under increased pressure to remove the solvent, the first phosphorus-containing compound may be obtained.

In the present disclosure, the second phosphorus-containing compound comprises a compound of Formula (II), a compound of Formula (III) or a combination thereof. Because the second phosphorus-containing compound does not contain a reactive functional group, it is unable to be crosslinked with a reactive functional group of other resins in a resin composition, so that the second phosphorus-containing compound may be used as a non-reactive phosphorus-containing flame retardant in a resin composition.

Formula (II)

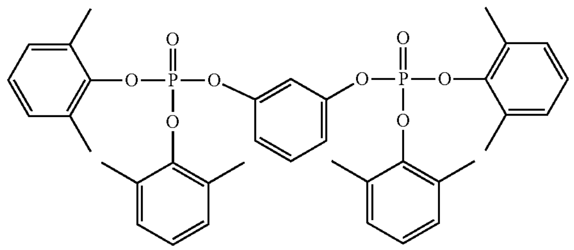

Formula (III)

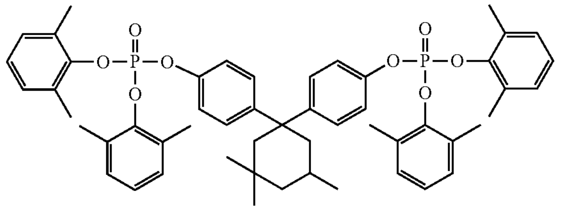

For example, in one embodiment, the resin composition of the present disclosure may further comprise a maleimide resin, an acenaphthylene or a combination thereof.

For example, in one embodiment, the maleimide resin comprises a monomer containing at least one maleimide group or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, the maleimide resin includes 4,4'-diphenylmethane bismaleimide, oligomer of phenylmethane maleimide (a.k.a. polyphenylmethane maleimide), bisphenol A diphenyl ether bismaleimide, 3,3'-dimethyl-5,5'-diethyl-4,4'-diphenylmethane bismaleimide (a.k.a. bis(3-ethyl-5-methyl-4-maleimidephenyl)methane), 3,3 '-dimethyl-5,5'-dipropyl-4,4'-diphenylmethane bismaleimide, biphenyl maleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, diethyl bismaleimidotoluene, vinyl benzyl maleimide (VBM), maleimide resin containing aliphatic long chain structure, or a combination thereof. Unless otherwise specified, the maleimide resins described above should be construed as including the modifications thereof.

For example, examples of the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry, products such as BMI-70 and BMI-80 available from K.I Chemical Industry Co., Ltd., products such as MIR-3000 and MIR-5000 available from Nippon Kayaku, or products such as DE-TDAB available from Evonik Industries.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

For example, in one embodiment, the acenaphthylene may be an acenaphthylene produced by TCI Chemical.

In addition to the aforesaid components, the resin composition disclosed herein may also further optionally comprise inorganic filler, flame retardant, curing accelerator, polymerization inhibitor, solvent, silane coupling agent, coloring agent, toughening agent, or a combination thereof. Unless otherwise specified, in the present disclosure, the optional flame retardants refers to other flame retardants different from the aforementioned first phosphorus-containing compound and the second phosphorus-containing compound.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (A100H), calcined talc, talc, silicon nitride, zirconium tungstate, petaliteor, calcined kaolin or a combination thereof. Moreover, the inorganic filler can be spherical, fibrous, plate-like, particulate, flake-like or whisker-like in shape and can be optionally pretreated by a silane coupling agent. For example, in one embodiment, relative to the total amount of "all other components" in the resin composition, the resin composition of the present disclosure may further comprise 0.1 time to 2 times of the aforesaid total amount of an inorganic filler, preferably 1 time to 1.4 times of the aforesaid total amount of an inorganic filler, but not limited thereto. For example, except for curing accelerator, inorganic filler and solvent in the resin composition, other components are collectively called "all other components".

For example, the other optional flame retardants different from the aforesaid first phosphorus-containing compound and the second phosphorus-containing compound may be any one or more flame retardants useful for preparing a prepreg, a resin film, a laminate or a printed circuit board, preferably comprising: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), phosphazene with structure different from the aforesaid first phosphorus-containing compound and the second phosphorus-containing compound (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), or a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). For example, in one embodiment, relative to 100 parts by weight of the vinyl group-containing polyphenylene ether resin, the resin composition of the present disclosure may further comprise 5 parts by weight to 100 parts by weight of a flame retardant different from the aforesaid first phosphorus-containing compound and the second phosphorus-containing compound, preferably 10 parts by weight to 20 parts by weight of a flame retardant different from the aforesaid first phosphorus-containing compound and the second phosphorus-containing compound, but not limited thereto.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide (DCP), tert-butyl peroxybenzoate, dibenzoyl peroxide (BPO), 2,5-dimethyl-2,5-di (tert-butylperoxy)-3-hexyne (25B), bis(tert-butylperoxyisopropyl)benzene or a combination thereof. For example, in one embodiment, relative to 100 parts by weight of the vinyl group-containing polyphenylene ether resin, the resin composition of the present disclosure may further comprise 0.001 part by weight to 2 parts by weight of a curing accelerator, preferably 0.2 part by weight to 0.5 part by weight of a curing accelerator, but not limited thereto.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis (4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like. For example, in one embodiment, relative to 100 parts by weight of the vinyl group-containing polyphenylene ether resin, the resin composition of the present disclosure may further comprise 0.001 part by weight to 5 parts by weight of polymerization inhibitor, preferably 0.01 part by weight to 3 parts by weight of polymerization inhibitor, but not limited thereto.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof. For example, in one embodiment, relative to 100 parts by weight of the vinyl group-containing polyphenylene ether resin, the resin composition of the present disclosure may further comprise 20 part by weight to 200 parts by weight of solvent, preferably 50 parts by weight to 70 parts by weight of solvent, but not limited thereto.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane. For example, in one embodiment, relative to 100 parts by weight of the vinyl group-containing polyphenylene ether resin, the resin composition of the present disclosure may further comprise 0.001 part by weight to 2 parts by weight of silane coupling agent, preferably 0.01 part by weight to 1 part by weight of silane coupling agent, but not limited thereto.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof. For example, in one embodiment, relative to 100 parts by weight of the vinyl group-containing polyphenylene ether resin, the resin composition of the present disclosure may further comprise 1 part by weight to 20 parts by weight of toughening agent, preferably 3 parts by weight to 10 parts by weight of toughening agent, but not limited thereto.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 120° C. to 180° C., preferably 140° C. to 160° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 230° C. and a suitable curing time being 60 to 240 minutes and preferably 90 to 180 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: difference rate of dissipation factor before and after 24 hours of water absorption, Z-axis coefficient of thermal expansion, dissipation factor after 24 hours of water absorption, flame retardancy, PCT (5 hours) water absorption rate, PCT (5 hours) thermal resistance, copper foil peeling strength, interlayer bonding strength and dissipation factor before 24 hours of water absorption.

For example, the resin composition according to the present disclosure or the article made therefrom may achieve one, more or all of the following properties:

a difference rate of dissipation factor of less than or equal to 83% calculated according to a dissipation factor as measured by reference to JIS C2565 at 10 GHz before and after 24 hours of water absorption performed at constant temperature by reference to JIS C6481, such as between 59% and 83%;

a Z-axis coefficient of thermal expansion as measured by reference to IPC-TM-650 2.4.24.5 of less than or equal to 32 ppm/° C., such as between 23 ppm/° C. and 32 ppm/° C.; and a dissipation factor of less than or equal to 0.0049 as measured by reference to JIS C2565 at 10 GHz after 24 hours of water absorption performed at constant temperature by reference to JIS C6481, such as between 0.0039 and 0.0049.

For example, the resin composition according to the present disclosure or the article made therefrom may also achieve one, more or all of the following properties:

a flame retardancy of V-0 rating as measured by reference to UL94;

a water absorption rate after 5 hours of moisture absorption in a pressure cooking test (PCT) as measured by reference to IPC-TM-650 2.6.16.1 of less than or equal to 0.25%, such as between 0.18% and 0.25%;

absence of delamination in a solder dip test conducted by reference to IPC-TM-650 2.4.23 after being subjected to moisture absorption in a pressure cooking test (PCT) conducted by reference to IPC-TM-650 2.6.16.1;

a copper foil peeling strength as measured by reference to IPC-TM-650 2.4.8 of greater than or equal to 4.0 lb/in, such as between 4.0 lb/in and 4.4 lb/in;

an interlayer bonding strength as measured by reference to IPC-TM-650 2.4.8 of greater than or equal to 3.5 lb/in, such as between 3.5 lb/in and 3.9 lb/in; and a dissipation factor as measured by reference to JIS C2565 at 10 GHz of less than or equal to 0.0029, such as between 0.0023 and 0.0029.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

OPE-2st 1200: vinylbenzyl group-containing biphenyl polyphenylene ether resin, available from Mitsubishi Gas Chemical Co., Inc.

SA9000: methacrylate group-containing polyphenylene ether resin, available from Sabic.

Formula (I) A: the first phosphorus-containing compound of the present disclosure, comprising a compound of Formula (IV), a compound of Formula (V) and a compound of Formula (VI), Formula (IV): Formula (V): Formula (VI)=50-60: 35-45: 0-5 (mol %), commercially available or prepared by Applicant by reference to Synthesis Example 1.

Formula (I) B: the first phosphorus-containing compound of the present disclosure, comprising a compound of Formula (IV), a compound of Formula (V) and a compound of Formula (VI), Formula (IV): Formula (V): Formula (VI)=40-50: 30-40: 10-20 (mol %), commercially available or prepared by Applicant by reference to Synthesis Example 1.

SPV-100: allyl group-containing phosphazene compound, available from Otsuka Chemical Co., Ltd, as shown below.

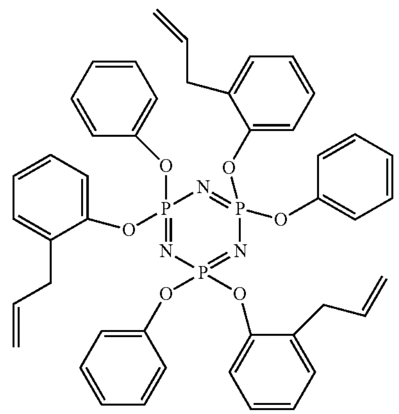 [SMILES: C=CCc1ccccc1OP1(Oc2ccccc2)=NP(Oc2ccccc2)(Oc2ccccc2CC=C)=NP(Oc2ccccc2)(Oc2ccccc2CC=C)=N1]

Formula (II): the second phosphorus-containing compound of the present disclosure, available from Daihachi Chemical Industry Co., Ltd.

Formula (II)

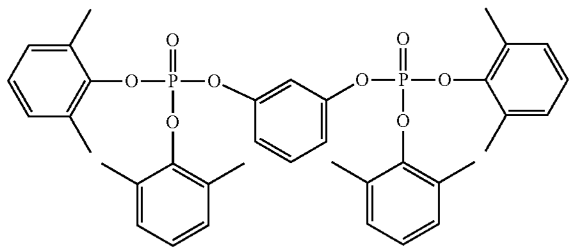

Formula (III): the second phosphorus-containing compound of the present disclosure, available from Daihachi Chemical Industry Co., Ltd.

Formula (III)

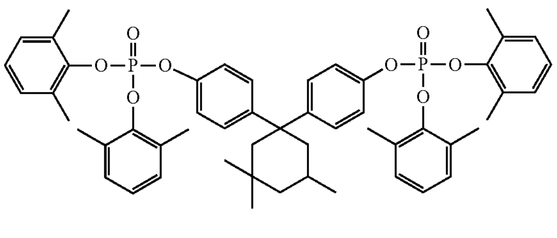

SPB-100: phosphazene compound, available from Otsuka Chemical Co., Ltd.

Di-DOPO: compound as shown below, prepared by Applicant by reference to the Formula (Ia) in China Patent No. CN105936745B.

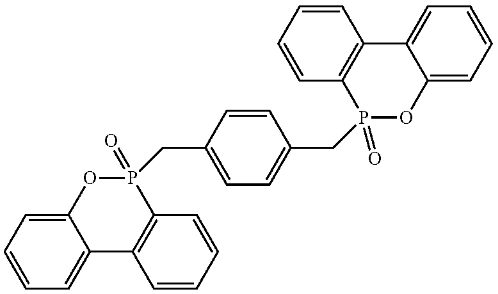 [SMILES: O=P1(Cc2ccc(CP3(=O)Oc4ccccc4-c4ccccc43)cc2)Oc2ccccc2-c2ccccc21]

PQ-60: p-xylylene-bis-diphenylphosphine oxide, available from Chin Yee Chemical Co., Ltd.

OP-935: aluminium diethyl phosphinate, available from Clariant.

Ricon184MA6: styrene-butadiene-maleic anhydride terpolymer, available from Cray Valley.

Ricon130MA13: butadiene-maleic anhydride copolymer, available from Cray Valley.

BMI-5100: 3,3 '-dimethyl-5,5'-diethyl-4,4'-diphenylmethane bismaleimide, available from Daiwakasei Industry Co., Ltd.

Acenaphthylene: available from TCI Chemical.

DCP: dicumyl peroxide, available from NOF Corporation.

SC2050 SMJ: spherical silica pre-treated by acrylic silane coupling agent, available from Admatechs. In the Tables, the amount symbol "R" of inorganic filler represents the total amount of "all other components" in the resin composition of each Example or each Comparative Example. Except for curing accelerator, inorganic filler and solvent in the resin composition, other components are collectively called "all other components". In the Tables, the amount symbol "R*120%" of inorganic filler represents the amount of inorganic filler is 1.2 times of the aforesaid "R". For example, in Example E1, R*120% represents that the amount of inorganic filler is 180 parts by weight (150 parts by weight multiplied by 120%). Similarly, in Example E2, R*120% represents that the amount of inorganic filler is 162 parts by weight (135 parts by weight multiplied by 120%).

TOL: toluene, commercially available.

MEK: methyl ethyl ketone, commercially available.

Synthesis Example 1

1 mol of hexachlorocyclotriphosphazene, 6 mol of p-vinylphenol, 6 mol of phenol and a proper amount of solvent (having a weight ratio of toluene to methyl ethyl ketone of 1:1) were added to a reactor, and the mixture was stirred and well-mixed, followed by introducing nitrogen and stirring continuously. After heated to 90° C., the mixture was added with a proper amount of sodium hydroxide and tetrabutylammonium iodide and continued reacting for 6 hours, followed by cooling to room temperature and filtration. After the filtrate was distilled under increased pressure to remove the solvent, the first phosphorus-containing compound may be obtained, comprising a mixture of the compound Formula (IV), the compound of (V) and the compound of Formula (VI).

Compositions and test results of resin compositions of Examples and Comparative Examples are listed below (in part by weight):

TABLE 1

| Resin compositions of Examples (in part by weight) and test results | | | | | | | |
|---|---|---|---|---|---|---|---|
| Component | Name | E1 | E2 | E3 | E4 | E5 | E6 |
| vinyl group-containing polyphenylene ether resin | OPE-2st 1200 | 100 | 100 | 100 | 100 | 100 | 100 |
| | SA9000 | | | | | | |
| first phosphorus-containing compound | Formula (I) A | 30 | 15 | 45 | 30 | 30 | 30 |
| | Formula (I) B | | | | | | |
| | SPV-100 | | | | | | |
| second phosphorus-containing compound | Formula (II) | 10 | 10 | 10 | 5 | 15 | |
| | Formula (III) | | | | | | 10 |
| | SPB-100 | | | | | | |
| | Di-DOPO | | | | | | |
| | PQ-60 | | | | | | |
| | OP-935 | | | | | | |
| polyolefin | Ricon184MA6 | 10 | 10 | 10 | 10 | 10 | 10 |
| | Ricon130MA13 | | | | | | |
| maleimide resin | BMI-5100 | | | | | | |
| acenaphthylene | acenaphthylene | | | | | | |
| curing accelerator | DCP | 0.3 | 0.3 | 0.3 | 0.3 | 0.3 | 0.3 |
| inorganic filler | SC2050 SMJ | R*120% | R*120% | R*120% | R*120% | R*120% | R*120% |
| solvent | MEK:TOL = 80:20 | 60 | 60 | 60 | 60 | 60 | 60 |
| Property | Unit | E1 | E2 | E3 | E4 | E5 | E6 |
| flame retardancy | none | V-0 | V-0 | V-0 | V-0 | V-0 | V-0 |
| PCT (5 hours) water absorption rate | % | 0.20 | 0.18 | 0.23 | 0.19 | 0.22 | 0.25 |
| PCT (5 hours) thermal resistance | none | PASS | PASS | PASS | PASS | PASS | PASS |
| copper foil peeling strength | lb/in | 4.2 | 4.3 | 4.0 | 4.4 | 4.0 | 4.4 |
| interlayer bonding strength | lb/in | 3.7 | 3.9 | 3.5 | 3.5 | 3.6 | 3.8 |
| dissipation factor before 24 hours of water absorption | none | 0.0026 | 0.0024 | 0.0029 | 0.0028 | 0.0023 | 0.0023 |
| dissipation factor after 24 hours of water absorption | none | 0.0045 | 0.0042 | 0.0049 | 0.0047 | 0.0041 | 0.0040 |
| difference in dissipation factor | none | 0.0019 | 0.0018 | 0.0020 | 0.0019 | 0.0018 | 0.0017 |
| difference rate of dissipation factor | % | 73 | 75 | 69 | 68 | 78 | 74 |
| Z-axis coefficient of thermal expansion | ppm/° C. | 25 | 29 | 31 | 24 | 30 | 27 |

TABLE 2

| Resin compositions of Examples (in part by weight) and test results | | | | | | | |
|---|---|---|---|---|---|---|---|
| Component | Name | E7 | E8 | E9 | E10 | E11 | E12 |
| vinyl group-containing polyphenylene ether resin | OPE-2st 1200 | | 100 | 100 | 100 | 50 | 50 |
| | SA9000 | 100 | | | | 50 | 50 |
| first phosphorus-containing compound | Formula (I) A | 30 | 30 | | 25 | 30 | 30 |
| | Formula (I) B | | | 30 | | 15 | |
| | SPV-100 | | | | | | |
| second phosphorus-containing compound | Formula (II) | 10 | 10 | 10 | 8 | 8 | 10 |
| | Formula (III) | | | | | | 2 |
| | SPB-100 | | | | | | |
| | Di-DOPO | | | | 10 | 15 | 10 |
| | PQ-60 | | | | | 5 | 5 |
| | OP-935 | | | | | | |
| polyolefin | Ricon184MA6 | 10 | 20 | 10 | 10 | 15 | |
| | Ricon130MA13 | | | | | | 10 |
| maleimide resin | BMI-5100 | | | | | 15 | 5 |
| acenaphthylene | acenaphthylene | | | 10 | 10 | | 15 |
| curing accelerator | DCP | 0.3 | 0.3 | 0.3 | 0.3 | 0.2 | 0.5 |
| inorganic filler | SC2050 SMJ | R*120% | R*120% | R*120% | R*120% | R*140% | R*100% |
| solvent | MEK:TOL = 80:20 | 60 | 60 | 60 | 60 | 70 | 50 |
| Property | Unit | E7 | E8 | E9 | E10 | E11 | E12 |
| flame retardancy | none | V-0 | V-0 | V-0 | V-0 | V-0 | V-0 |
| PCT (5 hours) water absorption rate | % | 0.23 | 0.22 | 0.20 | 0.21 | 0.25 | 0.24 |
| PCT (5 hours) thermal resistance | none | PASS | PASS | PASS | PASS | PASS | PASS |

TABLE 2-continued

| Resin compositions of Examples (in part by weight) and test results | | | | | | | |
|---|---|---|---|---|---|---|---|
| copper foil peeling strength | lb/in | 4.3 | 4.4 | 4.1 | 4.0 | 4.4 | 4.2 |
| interlayer bonding strength | lb/in | 3.9 | 3.9 | 3.7 | 3.6 | 3.8 | 3.8 |
| dissipation factor before 24 hours of water absorption | none | 0.0023 | 0.0028 | 0.0024 | 0.0027 | 0.0029 | 0.0027 |
| dissipation factor after 24 hours of water absorption | none | 0.0042 | 0.0049 | 0.0039 | 0.0048 | 0.0049 | 0.0043 |
| difference in dissipation factor | none | 0.0019 | 0.0021 | 0.0015 | 0.0021 | 0.0020 | 0.0016 |
| difference rate of dissipation factor | % | 83 | 75 | 63 | 78 | 69 | 59 |
| Z-axis coefficient of thermal expansion | ppm/° C. | 27 | 32 | 23 | 26 | 29 | 26 |

TABLE 3

| Resin compositions of Comparative Examples (in part by weight) and test results | | | | | | |
|---|---|---|---|---|---|---|
| Component | Name | C1 | C2 | C3 | C4 | C5 |
| vinyl group-containing polyphenylene ether resin | OPE-2st 1200 | 100 | 100 | 100 | 100 | 100 |
| | SA9000 | | | | | |
| first phosphorus-containing compound | Formula (I) A | 40 | | | | 30 |
| | Formula (I) B | | | | | |
| | SPV-100 | | | 30 | 30 | |
| second phosphorus-containing compound | Formula (II) | | 40 | 10 | | |
| | Formula (III) | | | | 10 | |
| | SPB-100 | | | | | 10 |
| | Di-DOPO | | | | | |
| | PQ-60 | | | | | |
| | OP-935 | | | | | |
| polyolefin | Ricon184MA6 | 10 | 10 | 10 | 10 | 10 |
| | Ricon130MA13 | | | | | |
| maleimide resin | BMI-5100 | | | | | |
| acenaphthylene | acenaphthylene | | | | | |
| curing accelerator | DCP | 0.3 | 0.3 | 0.3 | 0.3 | 0.3 |
| inorganic filler | SC2050 SMJ | R*120% | R*120% | R*120% | R*120% | R*120% |
| solvent | MEK:TOL = 80:20 | 60 | 60 | 60 | 60 | 60 |
| Property | Unit | C1 | C2 | C3 | C4 | C5 |
| flame retardancy | none | V-0 | V-1 | V-0 | V-0 | V-1 |
| PCT (5 hours) water absorption rate | % | 0.19 | 0.29 | 0.22 | 0.23 | 0.21 |
| PCT (5 hours) thermal resistance | none | PASS | FAIL | FAIL | FAIL | FAIL |
| copper foil peeling strength | lb/in | 3.8 | 3.0 | 3.3 | 3.6 | 4.2 |
| interlayer bonding strength | lb/in | 3.5 | 3.0 | 2.8 | 3.2 | 3.7 |
| dissipation factor before 24 hours of water absorption | none | 0.0031 | 0.0021 | 0.0032 | 0.0029 | 0.0033 |
| dissipation factor after 24 hours of water absorption | none | 0.0063 | 0.0051 | 0.0068 | 0.0059 | 0.0058 |
| difference in dissipation factor | none | 0.0032 | 0.0030 | 0.0036 | 0.0030 | 0.0025 |
| difference rate of dissipation factor | % | 103 | 143 | 113 | 103 | 76 |
| Z-axis coefficient of thermal expansion | ppm/° C. | 30 | 46 | 39 | 41 | 37 |

TABLE 4

| Resin compositions of Comparative Examples (in part by weight) and test results | | | | | | |
|---|---|---|---|---|---|---|
| Component | Name | C6 | C7 | C8 | C9 | C10 |
| vinyl group-containing polyphenylene ether resin | OPE-2st 1200 | 100 | 100 | 100 | 100 | 100 |
| | SA9000 | | | | | |
| first phosphorus-containing compound | Formula (I) A | 30 | 30 | | | |
| | Formula (I) B | | | | | |
| | SPV-100 | | | 30 | 30 | |

TABLE 4-continued

| Resin compositions of Comparative Examples (in part by weight) and test results | | | | | | |
|---|---|---|---|---|---|---|
| second phosphorus-containing compound | Formula (II) | | | | | 10 |
| | Formula (III) | | | | | |
| | SPB-100 | | | 10 | | |
| | Di-DOPO | 10 | | | | 30 |
| | PQ-60 | | 10 | | 10 | |
| | OP-935 | | | | | |
| polyolefin | Ricon184MA6 | 10 | 10 | 10 | 10 | 10 |
| | Ricon130MA13 | | | | | |
| maleimide resin | BMI-5100 | | | | | |
| acenaphthylene | acenaphthylene | | | | | |
| curing accelerator | DCP | 0.3 | 0.3 | 0.3 | 0.3 | 0.3 |
| inorganic filler | SC2050 SMJ | R*120% | R*120% | R*120% | R*120% | R*120% |
| solvent | MEK:TOL = 80:20 | 60 | 60 | 60 | 60 | 60 |
| Property | Unit | C6 | C7 | C8 | C9 | C10 |
| flame retardancy | none | V-1 | V-1 | V-0 | V-0 | V-1 |
| PCT (5 hours) water absorption rate | % | 0.27 | 0.26 | 0.27 | 0.20 | 0.30 |
| PCT (5 hours) thermal resistance | none | PASS | PASS | FAIL | FAIL | PASS |
| copper foil peeling strength | lb/in | 3.8 | 3.5 | 3.6 | 3.2 | 4.4 |
| interlayer bonding strength | lb/in | 3.5 | 3.0 | 3.3 | 2.8 | 3.9 |
| dissipation factor before 24 hours of water absorption | none | 0.0030 | 0.0034 | 0.0031 | 0.0029 | 0.0025 |
| dissipation factor after 24 hours of water absorption | none | 0.0058 | 0.0069 | 0.0064 | 0.0059 | 0.0050 |
| difference in dissipation factor | none | 0.0028 | 0.0035 | 0.0033 | 0.0030 | 0.0025 |
| difference rate of dissipation factor | % | 93 | 103 | 106 | 103 | 100 |
| Z-axis coefficient of thermal expansion | ppm/° C. | 35 | 40 | 39 | 42 | 42 |

TABLE 5

| Resin compositions of Comparative Examples (in part by weight) and test results | | | | | | |
|---|---|---|---|---|---|---|
| Component | Name | C11 | C12 | C13 | C14 | C15 |
| vinyl group-containing polyphenylene ether resin | OPE-2st 1200 | 100 | 100 | 100 | 100 | 100 |
| | SA9000 | | | | | |
| first phosphorus-containing compound | Formula (I) A | | | | | |
| | Formula (I) B | | | | | |
| | SPV-100 | | | | | |
| second phosphorus-containing compound | Formula (II) | 10 | 10 | | | 10 |
| | Formula (III) | | | | | |
| | SPB-100 | | | 10 | 10 | 30 |
| | Di-DOPO | | | | | |
| | PQ-60 | 30 | | 30 | | |
| | OP-935 | | 30 | | 30 | |
| polyolefin | Ricon184MA6 | 10 | 10 | 10 | 10 | 10 |
| | Ricon130MA13 | | | | | |
| maleimide resin | BMI-5100 | | | | | |
| acenaphthylene | acenaphthylene | | | | | |
| curing accelerator | DCP | 0.3 | 0.3 | 0.3 | 0.3 | 0.3 |
| inorganic filler | SC2050 SMJ | R*120% | R*120% | R*120% | R*120% | R*120% |
| solvent | MEK:TOL = 80:20 | 60 | 60 | 60 | 60 | 60 |
| Property | Unit | C11 | C12 | C13 | C14 | C15 |
| flame retardancy | none | V-1 | V-0 | V-1 | V-1 | V-1 |
| PCT (5 hours) water absorption rate | % | 0.28 | 0.32 | 0.32 | 0.35 | 0.27 |
| PCT (5 hours) thermal resistance | none | PASS | FAIL | PASS | FAIL | FAIL |
| copper foil peeling strength | lb/in | 3.8 | 4.2 | 3.9 | 4.2 | 3.8 |
| interlayer bonding strength | lb/in | 3.4 | 3.7 | 3.5 | 3.7 | 3.4 |
| dissipation factor before 24 hours of water absorption | none | 0.0027 | 0.0029 | 0.0032 | 0.0037 | 0.0030 |
| dissipation factor after 24 hours of water absorption | none | 0.0052 | 0.0062 | 0.0067 | 0.0079 | 0.0060 |
| difference in dissipation factor | none | 0.0025 | 0.0033 | 0.0035 | 0.0042 | 0.0030 |

TABLE 5-continued

| Resin compositions of Comparative Examples (in part by weight) and test results | | | | | | |
|---|---|---|---|---|---|---|
| difference rate of dissipation factor | % | 93 | 114 | 109 | 114 | 100 |
| Z-axis coefficient of thermal expansion | ppm/° C. | 43 | 40 | 42 | 39 | 44 |

Samples (specimens) for the properties measured above were prepared as described below and tested and analyzed under specified conditions below.

1. Prepreg (PP): Resin composition (in part by weight) from each Example (E1-E12) or each Comparative Example (C1-C15) was separately added to a stirred tank and well-mixed to form a varnish. Then the varnish was loaded to an impregnation tank, and a fiberglass fabric (e.g., 1080 or 2116 L-glass fiber fabric, available from Asahi) was impregnated into the impregnation tank to adhere the resin composition onto the fiberglass fabric, followed by heating and baking at 140° C.-160° C. for about 3 minutes to obtain a prepreg. Prepregs made from 1080 L-glass fiber fabric have a resin content of about 70%, and prepregs made from 2116 L-glass fiber fabric have a resin content of about 55%.
2. Copper-containing laminate 1 (i.e., copper-clad laminate 1, formed by lamination of two prepregs): Two 18 μm reverse treatment foils (RTF) and two prepregs obtained from 1080 L-glass fiber fabrics impregnated with each Example or Comparative Example were prepared, each prepreg having a resin content of about 70%. A copper foil, two prepregs and a copper foil were superimposed in such order and then subjected to a vacuum condition for lamination at 42 $kgf/cm^2$ pressure and 230° C. for 150 minutes to form each copper-containing laminate 1. Insulation layers were formed by laminating two sheets of prepreg between the two copper foils, and the resin content of the insulation layers is about 70%.
3. Copper-containing laminate 2 (formed by lamination of eight prepregs): Two 18 μm reverse treatment copper foils (RTF) and eight prepregs obtained from 2116 L-glass fiber fabrics impregnated with each Example or Comparative Example were prepared, each prepreg having a resin content of about 55%. A copper foil, eight prepregs and a copper foil were superimposed in such order and then subjected to a vacuum condition for lamination at 42 $kgf/cm^2$ pressure and 230° C. for 150 minutes to form each copper-containing laminate 2. Insulation layers were formed by laminating eight sheets of prepreg between the two copper foils, and the resin content of the insulation layers is about 55%.
4. Copper-free laminate 1 (formed by lamination of two prepregs): Each aforesaid copper-containing laminate 1 was etched to remove the two copper foils to obtain a copper-free laminate 1 (formed by lamination of two prepregs), having a resin content of the insulation layers of about 70%.
5. Copper-free laminate 2 (formed by lamination of eight prepregs): Each aforesaid copper-containing laminate 2 was etched to remove the two copper foils to obtain a copper-free laminate 2 (formed by lamination of eight prepregs), having a resin content of the insulation layers of about 55%.

Test items and test methods are described below.

Flame Retardancy

The aforesaid copper-free laminate 2 (obtained by laminating eight prepregs, resin content of about 55%) sample having a size of 125 mm×13 mm was subjected to flame retardancy measurement. The flame retardancy test was performed in accordance with the UL94 rating, and the results were represented by V-0, V-1, or V-2, wherein V-0 indicates a superior flame retardancy to V-1, V-1 indicates a superior flame retardancy to V-2, and burnout of sample is the worst. For example, articles made from the resin composition disclosed herein have a flame retardancy of V-0 as measured by reference to the UL94 rating.

Pressure Cooking Test (PCT) Water Absorption Rate

A 2 inch×2 inch copper-free laminate 2 sample (obtained by laminating eight prepregs, resin content of about 55%) was placed in a 105±10° C. oven and baked for 1 hour, then cooled at room temperature of about 25° C. for 10 minutes and weighed to give a weight value W1 representing the weight of the copper-free laminate 2; then the sample was subjected to a pressure cooking test (PCT) by reference to IPC-TM-650 2.6.16.1 for 5 hours of moisture absorption (test temperature of 121° C. and relative humidity of 100%) and wiped to remove residual water on the surface; the sample was weighed again to give a weight value W2 representing the weight of the copper-free laminate 2 after water absorption. The PCT (5 hours) water absorption rate (%) was calculated as follow: water absorption rate (%)=[(W2−W1)/W1]×100%.

In the technical field to which the present disclosure pertains, lower water absorption rate after moisture absorption in a pressure cooking test is better. A difference in PCT (5 hours) water absorption rate of greater than or equal to 0.05% represents a substantial difference (i.e., significant technical difficulty) in PCT (5 hours) water absorption rate in different laminates. For example, articles made from the resin composition disclosed herein have a water absorption rate after moisture absorption in a pressure cooking test (PCT) conducted by reference to IPC-TM-650 2.6.16.1 of less than or equal to 0.25%, such as between 0.18% and 0.25%.

Thermal Resistance after Moisture Absorption (PCT & S/D, PCT (5 Hours) Thermal Resistance)

The aforesaid copper-free laminate 2 (obtained by laminating eight prepregs) was subjected to pressure cooking test (PCT) by reference to IPC-TM-650 2.6.16.1 for five hours of moisture absorption (testing temperature of 121° C., relative humidity of 100%), and then by reference to IPC-TM-650 2.4.23, the sample after moisture absorption was immersed into a 288° C. solder bath for 20 seconds, removed and then inspected to determine the absence or presence of delamination (delamination represents "FAIL"; absence of delamination represents "PASS"); for example, interlayer separation between insulation layers represents delamination. Interlayer separation refers to blistering or separation between any layers of the laminate. For example, articles made from the resin composition disclosed herein are characterized by the absence of delamination in a solder dip test conducted by reference to IPC-TM-650 2.4.23 after moisture absorption in a pressure cooking test (PCT) conducted by reference to IPC-TM-650 2.6.16.1.

Copper Foil Peeling Strength (a.k.a. Peeling Strength, P/S)

In the copper foil peeling strength test, the copper-containing laminate 2 (obtained by laminating eight prepregs, resin content of about 55%) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate.

In the technical field to which the present disclosure pertains, higher copper foil peeling strength is better. A difference in copper foil peeling strength of greater than or equal to 0.3 lb/in represents a substantial difference (i.e., significant technical difficulty) in copper foil peeling strength in different laminates. For example, articles made from the resin composition disclosed herein have a copper foil peeling strength as measured by reference to IPC-TM-650 2.4.8 of greater than or equal to 4.0 lb/in, such as between 4.0 lb/in and 4.4 lb/in.

Interlayer Bonding Strength (a.k.a. Bonding Strength, B/S)

In the interlayer bonding strength test, the copper-containing laminate 2 (obtained by laminating eight prepregs, having a resin content of about 55%) was cut into a rectangular specimen with a width of 12.7 mm and a length of greater than 60 mm and tested by using a tensile strength tester by reference to IPC-TM-650 2.4.8. With the proviso that the surface copper foil was not etched off and the measurement position was set at the interface between the second prepreg layer and the third prepreg layer, at room temperature (about 25° C.), the cured insulation laminate was tested to measure the force (lb/in) required to separate the two layers.

In the technical field to which the present disclosure pertains, higher interlayer bonding strength is better. A difference in interlayer bonding strength of greater than or equal to 0.3 lb/in represents a substantial difference (i.e., significant technical difficulty) in interlayer bonding strength in different laminates. For example, articles made from the resin composition disclosed herein have a interlayer bonding strength as measured by reference to IPC-TM-650 2.4.8 of greater than or equal to 3.5 lb/in, such as between 3.5 lb/in and 3.9 lb/in.

Dissipation Factor (Df) Before and After 24 Hours of Water Absorption and Difference Rate of Dissipation Factor The aforesaid copper-free laminate 1 (obtained by laminating two prepregs, resin content of about 70%) was subjected to the measurement of difference rate of dissipation factor. Each sample was measured by reference to JIS C2565 at room temperature (about 25° C.) and at 10 GHz, from which a first dissipation factor (i.e., dissipation factor before 24 hours of water absorption) was obtained and defined as Df1. In addition, according to the method described in JIS C6481, the same sample was placed in constant temperature air (50±2° C.) for pretreatment for 24 hours and then placed in constant temperature water (23±0.5° C.) for treatment for 24 hours, followed by fully wiping the water on the surface of the sample with dried clean cloth. According to the process of measuring the first dissipation factor, the sample after having been subjected to a temperature of 23° C. for 24 hours was then measured again to obtain a second dissipation factor (i.e., dissipation factor after 24 hours of water absorption), which is defined as Df2. The difference in dissipation factor is defined as the second dissipation factor minus the first dissipation factor. For example, the difference in dissipation factor is equal to Df2−Df1. The difference rate of dissipation factor (%) is defined as the ratio of increase of the second dissipation factor relative to the first dissipation factor. For example, the difference rate of dissipation factor is equal to [(Df2−Df1)/Df1]×100%.

In the technical field to which the present disclosure pertains, lower dissipation factor before 24 hours of water absorption is better. A difference in dissipation factor before 24 hours of water absorption of greater than or equal to 0.0003 represents a substantial difference (i.e., significant technical difficulty) in dissipation factor before 24 hours of water absorption in different laminates. For example, articles made from the resin composition disclosed herein have a dissipation factor before 24 hours of water absorption as measured by reference to JIS C2565 at 10 GHz of less than or equal to 0.0029, such as between 0.0023 and 0.0029.

In the technical field to which the present disclosure pertains, lower dissipation factor after 24 hours of water absorption is better. A difference in dissipation factor after 24 hours of water absorption of greater than or equal to 0.0003 represents a substantial difference (i.e., significant technical difficulty) in dissipation factor after 24 hours of water absorption in different laminates. For example, articles made from the resin composition disclosed herein have a dissipation factor after 24 hours of water absorption as measured by reference to JIS C2565 at 10 GHz of less than or equal to 0.0049, such as between 0.0039 and 0.0049.

In the technical field to which the present disclosure pertains, lower difference rate of dissipation factor calculated according to dissipation factor before and after 24 hours of water absorption is better. A difference in difference rate of dissipation factor of greater than or equal to 5% represents a substantial difference (i.e., significant technical difficulty) in difference rate of dissipation factor in different laminates. For example, articles made from the resin composition disclosed herein have a difference rate of dissipation factor of less than or equal to 83% calculated according to a dissipation factor as measured by reference to JIS C2565 at 10 GHz before and after 24 hours of water absorption performed at constant temperature by reference to JIS C6481, such as between 59% and 83%.

Z-Axis Coefficient of Thermal Expansion (Z-CTE)

The copper-free laminate 2 (obtained by laminating eight prepregs, resin content of about 55%) sample was tested by thermal mechanical analysis (TMA) during the measurement of Z-axis coefficient of thermal expansion. The copper-free laminate 2 was cut into a sample with a length of 10 mm and a width of 10 mm. Each sample was heated from 35° C. to 300° C. at a heating rate of 10° C./minute and then subjected to the measurement of the coefficient of thermal expansion (ppm/° C.) in Z-axis in a temperature range (designated as al) of 50° C. to 110° C. by reference to IPC-TM-650 2.4.24.5.

In the technical field to which the present disclosure pertains, lower Z-axis coefficient of thermal expansion is better. A difference in Z-axis coefficient of thermal expansion of greater than or equal to 1 ppm/° C. represents a substantial difference (i.e., significant technical difficulty) in Z-axis coefficient of thermal expansion in different laminates. For example, articles made from the resin composition disclosed herein have a Z-axis coefficient of thermal expansion as measured by reference to IPC-TM-650 2.4.24.5 of less than or equal to 32 ppm/° C., such as between 23 ppm/° C. and 32 ppm/° C.

The following observations can be made from Table 1 to Table 5.

If the resin composition contains at the same time 100 parts by weight of a vinyl group-containing polyphenylene ether resin, 10 parts by weight to 20 parts by weight of a polyolefin, 15 parts by weight to 45 parts by weight of a first phosphorus-containing compound and 5 parts by weight to 15 parts by weight of a second phosphorus-containing compound, wherein the polyolefin comprises a styrene-butadiene-maleic anhydride terpolymer or a butadiene-maleic anhydride copolymer, the first phosphorus-containing compound comprises a compound of Formula (I), and the second phosphorus-containing compound comprises a compound of Formula (II), a compound of Formula (III) or a combination thereof, such as Examples E1-E12, it can achieve at the same time desirable properties including a difference rate of dissipation factor before and after 24 hours of water absorption of less than or equal to 83%, a Z-axis coefficient of thermal expansion of less than or equal to 32 ppm/° C. and a dissipation factor after 24 hours of water absorption of less than or equal to 0.0049. In contrast, Comparative Examples C1-C15 fail to achieve desirable results in at least one of difference rate of dissipation factor before and after 24 hours of water absorption, Z-axis coefficient of thermal expansion and dissipation factor after 24 hours of water absorption.

In contrast to Example E1, if the resin composition does not contain at the same time the first phosphorus-containing compound and second phosphorus-containing compound disclosed herein but only contains the first phosphorus-containing compound, such as Comparative Example C1, it will fail to achieve desirable improvement in difference rate of dissipation factor before and after 24 hours of water absorption and dissipation factor after 24 hours of water absorption.

In contrast to Example E1, if the resin composition does not contain at the same time the first phosphorus-containing compound and second phosphorus-containing compound disclosed herein but only contains the second phosphorus-containing compound, such as Comparative Example C2, it will fail to achieve desirable improvement in difference rate of dissipation factor before and after 24 hours of water absorption and Z-axis coefficient of thermal expansion.

In contrast to Example E1, if the resin composition does not contain the first phosphorus-containing compound disclosed herein but contains other flame retardants, such as SPV-100 in Comparative Examples C3-C4, it will fail to achieve desirable improvement in difference rate of dissipation factor before and after 24 hours of water absorption, dissipation factor after 24 hours of water absorption and Z-axis coefficient of thermal expansion.

In contrast to Example E1, if the resin composition does not contain the second phosphorus-containing compound disclosed herein but contains other flame retardants, such as SPB-100 in Comparative Example C5, it will fail to achieve desirable improvement in Z-axis coefficient of thermal expansion and dissipation factor after 24 hours of water absorption.

In contrast to Example E1, if the resin composition does not contain the second phosphorus-containing compound disclosed herein but contains other flame retardants, such as Di-DOPO in Comparative Example C6 and PQ-60 in Comparative Example C7, it will fail to achieve desirable improvement in difference rate of dissipation factor before and after 24 hours of water absorption, Z-axis coefficient of thermal expansion and dissipation factor after 24 hours of water absorption.

In contrast to Example E1, if the resin composition does not contain the first phosphorus-containing compound and the second phosphorus-containing compound disclosed herein but contains other flame retardants, such as SPV-100 in conjunction with SPB-100 in Comparative Example C8 and SPV-100 in conjunction with PQ-60 in Comparative Example C9, it will fail to achieve desirable improvement in difference rate of dissipation factor before and after 24 hours of water absorption, Z-axis coefficient of thermal expansion and dissipation factor after 24 hours of water absorption.

In contrast to Example E1, if the resin composition does not contain the first phosphorus-containing compound disclosed herein but contains the second phosphorus-containing compound disclosed herein with other non-reactive flame retardants, such as Comparative Example C10 (PX-200 in conjunction with Di-DOPO), C11 (PX-200 in conjunction with PQ-60), C12 (PX-200 in conjunction with OP-935) and C15 (PX-200 in conjunction with SPB-100), for Comparative Example C10, it will fail to achieve desirable improvement in difference rate of dissipation factor before and after 24 hours of water absorption and Z-axis coefficient of thermal expansion, and for Comparative Examples C11, C12 and C15, it will fail to achieve desirable improvement in difference rate of dissipation factor before and after 24 hours of water absorption, Z-axis coefficient of thermal expansion and dissipation factor after 24 hours of water absorption.

In contrast to Example E1, if the resin composition does not contain at the same time the first phosphorus-containing compound and the second phosphorus-containing compound disclosed herein but contains two kinds of non-reactive flame retardants, such as SPB-100 and PQ-60 in Comparative Example C13 and SPB-100 and OP-935 in Comparative Example C14, it will fail to achieve desirable improvement in difference rate of dissipation factor before and after 24 hours of water absorption, Z-axis coefficient of thermal expansion and dissipation factor after 24 hours of water absorption.

Overall, the resin composition of the present disclosure can achieve at the same time desirable properties including a difference rate of dissipation factor before and after 24 hours of water absorption of less than or equal to 83%, a Z-axis coefficient of thermal expansion of less than or equal to 32 ppm/° C., a dissipation factor after 24 hours of water absorption of less than or equal to 0.0049, a flame retardancy of V-0 rating, a PCT (5 hours) water absorption rate of less than or equal to 0.25%, absence of delamination in PCT (5 hours) thermal resistance, a copper foil peeling strength of greater than or equal to 4.0 lb/in, an interlayer bonding strength of greater than or equal to 3.5 lb/in and a dissipation factor before 24 hours of water absorption of less than or equal to 0.0029.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 100 parts by weight of a vinyl group-containing polyphenylene ether resin, 10 parts by weight to 20 parts by weight of a polyolefin, 15 parts by weight to 45 parts by weight of a first phosphorus-containing compound and 5 parts by weight to 15 parts by weight of a second phosphorus-containing compound, wherein:

the polyolefin comprises a styrene-butadiene-maleic anhydride terpolymer or a butadiene-maleic anhydride copolymer;

the first phosphorus-containing compound comprises a compound of Formula (I):

Formula (I)

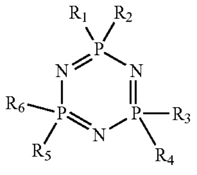

wherein any one, two or three of $R_1$ to $R_6$ are a p-vinylphenoxy group, and the remaining are a phenoxy group; and the second phosphorus-containing compound comprises a compound of Formula (II), a compound of Formula (III), or a combination thereof:

Formula (II)

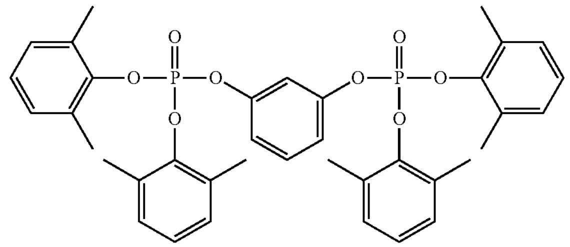

Formula (III)

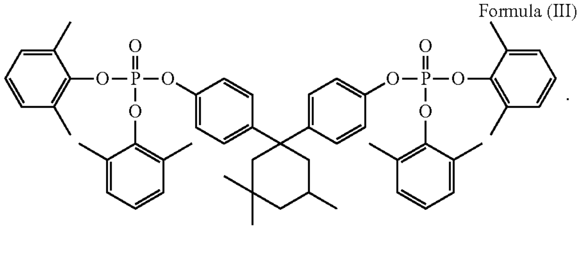 [SMILES: Cc1cccc(C)c1OP(=O)(Oc1ccc(C2(c3ccc(OP(=O)(Oc4c(C)cccc4C)Oc4c(C)cccc4C)cc3)CC(C)CC(C)(C)C2)cc1)Oc1c(C)cccc1C]

.

2. The resin composition of claim 1, wherein the vinyl group-containing polyphenylene ether resin comprises a vinylbenzyl group-containing biphenyl polyphenylene ether resin, a methacrylate group-containing polyphenylene ether resin or a combination thereof.

3. The resin composition of claim 1, wherein the first phosphorus-containing compound comprises a compound of Formula (IV), a compound of Formula (V), a compound of Formula (VI) or a combination thereof:

Formula (IV)

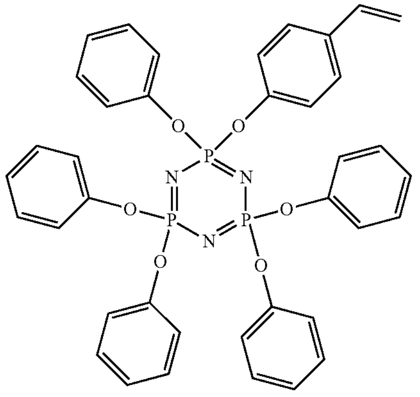

Formula (V)

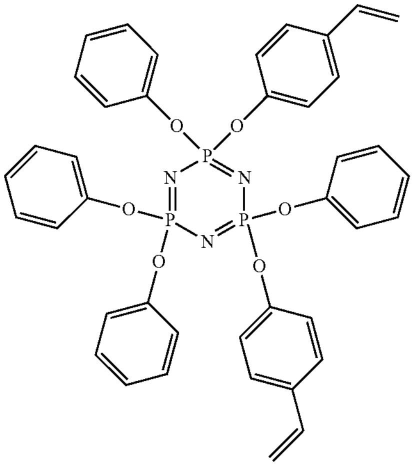

Formula (VI)

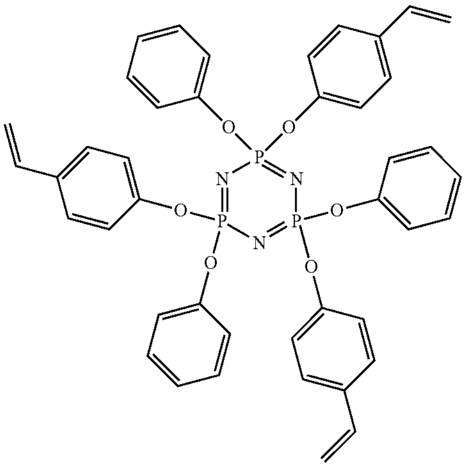

.

4. The resin composition of claim 1, further comprising maleimide resin, acenaphthylene or a combination thereof.

5. The resin composition of claim 1, further comprising inorganic filler, flame retardant, curing accelerator, polymerization inhibitor, solvent, silane coupling agent, coloring agent, toughening agent or a combination thereof.

6. An article made from the resin composition of claim 1, comprising a prepreg, a resin film, a laminate or a printed circuit board.

7. The article of claim 6, having a difference rate of dissipation factor of less than or equal to 83% calculated according to a dissipation factor as measured by reference to JIS C2565 at 10 GHz before and after 24 hours of water absorption performed at a constant temperature by reference to JIS C6481.

8. The article of claim 6, having a Z-axis coefficient of thermal expansion as measured by reference to IPC-TM-650 2.4.24.5 of less than or equal to 32 ppm/° C.

9. The article of claim 6, having a dissipation factor of less than or equal to 0.0049 as measured by reference to JIS C2565 at 10 GHz after 24 hours of water absorption performed at a constant temperature by reference to JIS C6481.

* * * * *